Feb. 24, 1925.

Re. 16,006

F. T. FLINCHBAUGH

CYLINDER REBORING MACHINE

Original Filed Feb. 8, 1921 3 Sheets-Sheet 1

Inventor

F. T. FLINCHBAUGH

By

Attorney

Feb. 24, 1925. Re. 16,006

F. T. FLINCHBAUGH

CYLINDER REBORING MACHINE

Original Filed Feb. 8, 1921 3 Sheets-Sheet 2

Inventor

F. T. FLINCHBAUGH.

By E. W. Bagford

Attorney

Feb. 24, 1925.

Re. 16,006

F. T. FLINCHBAUGH

CYLINDER REBORING MACHINE

Original Filed Feb. 8, 1921 3 Sheets-Sheet 3

Inventor:

F. T. FLINCHBAUGH.

By

His Attorney.

Reissued Feb. 24, 1925. Re. 16,006

UNITED STATES PATENT OFFICE.

FREDERICK T. FLINCHBAUGH, OF YORK, PENNSYLVANIA, ASSIGNOR TO WAYNE TOOL MANUFACTURING COMPANY, OF WAYNESBORO, PENNSYLVANIA, A CORPORATION OF PENNSYLVANIA.

CYLINDER-REBORING MACHINE.

Original No. 1,480,254, dated January 8, 1924, Serial No. 443,392, filed February 8, 1921. Application for reissue filed May 12, 1924. Serial No. 712,885.

*To all whom it may concern:*

Be it known that I, FREDERICK T. FLINCHBAUGH, a citizen of the United States, residing at York, in the county of York and State of Pennsylvania, have invented certain new and useful Improvements in Cylinder-Reboring Machines, of which the following is a specification.

This invention relates to an improved reboring tool for engine cylinders and has as one of its principal objects to provide a convenient and easily manipulated device of this character which may be readily attached to an engine block for selectively reboring the cylinders thereof.

The invention has as a further object to provide a machine embodying an improved feeding mechanism wherein the rate of feed of the cutter employed may be readily varied for a constant rate of rotation of the boring bar.

A further object of the invention is to provide a machine employing a separable base and gear case, wherein the base may be attached to an engine block for supporting the machine centered with respect to any one of the cylinders of the block selectively and wherein the gear case may be detached from the base for removing the cutter-head, this construction providing an arrangement whereby the centering of the base will not be molested so that by simply replacing the gear case upon the base, work upon the cylinder may be continued.

And the invention has as a still further object to provide a machine wherein the cutter may be mechanically withdrawn from the cylinder into the base so that the gear case and cutter-head may subsequently be removed with ease.

Other incidental objects will appear hereinafter.

Figure 1:
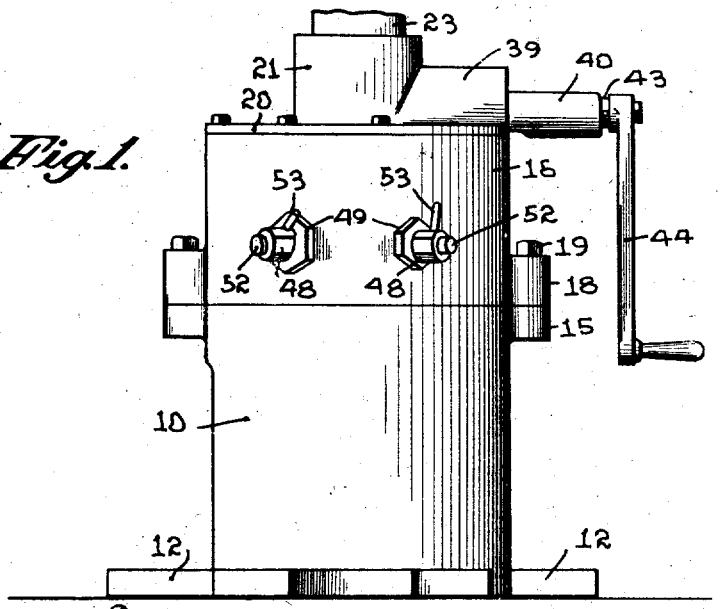

Referring to the accompanying drawings which are made a part hereof and on which similar reference characters indicate similar parts, Figure 1 is a fragmentary side elevation of my improved reboring machine.

Figure 3:
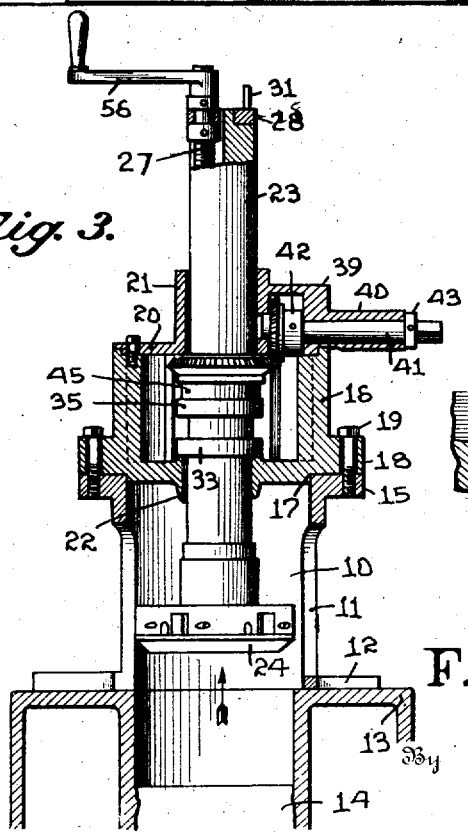
Figure 7:
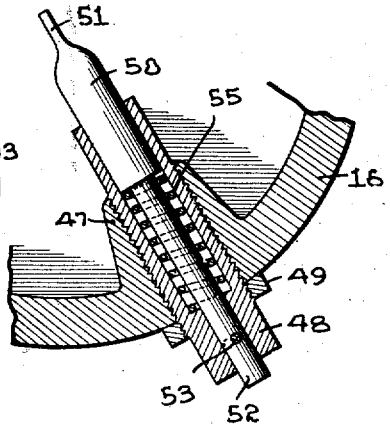
Figures 2, 8:
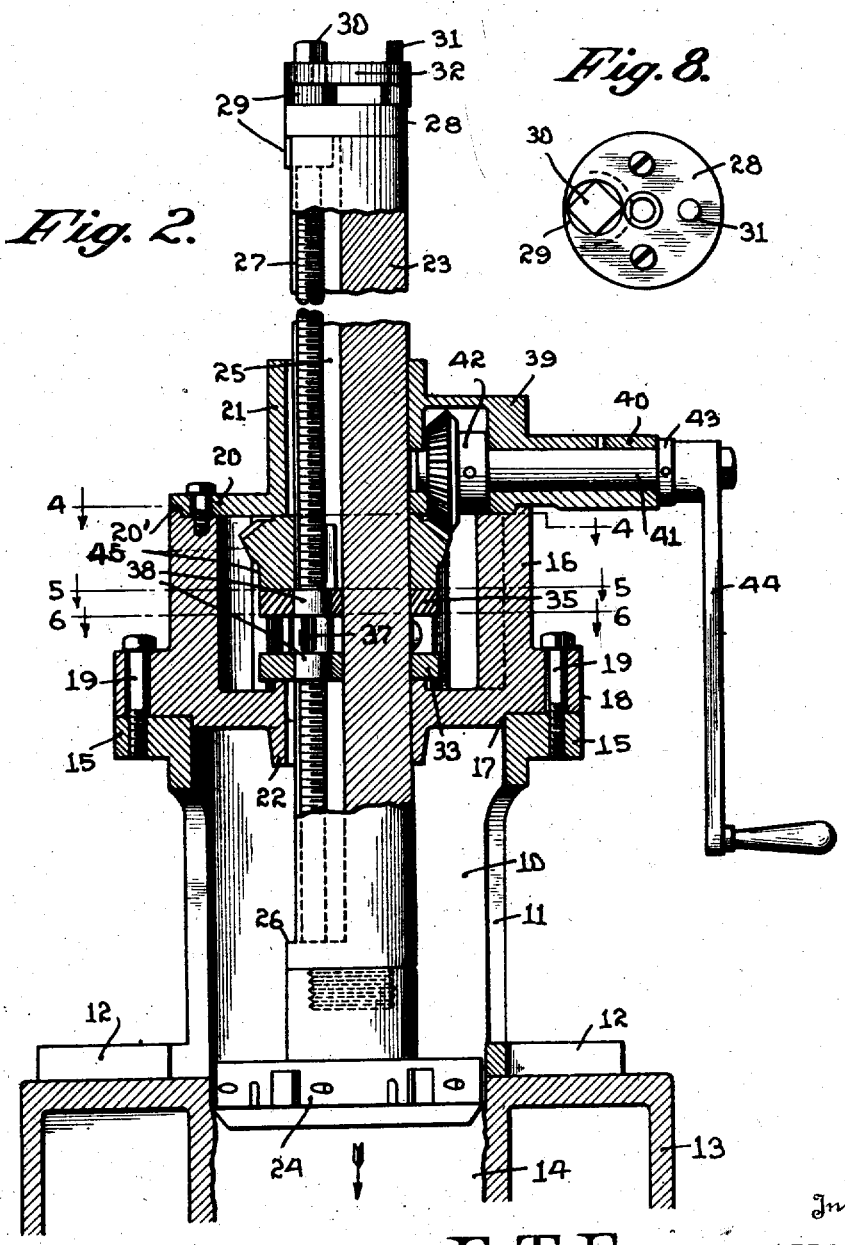
Figure 4:
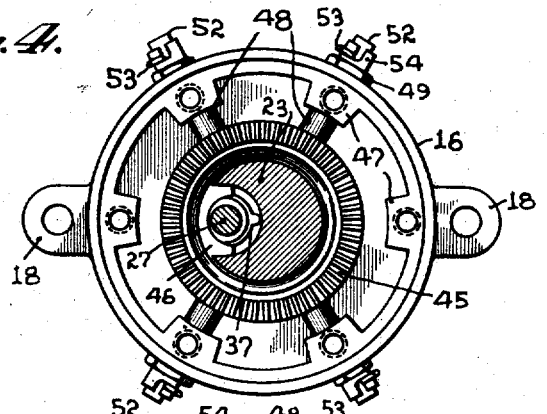
Figure 5:
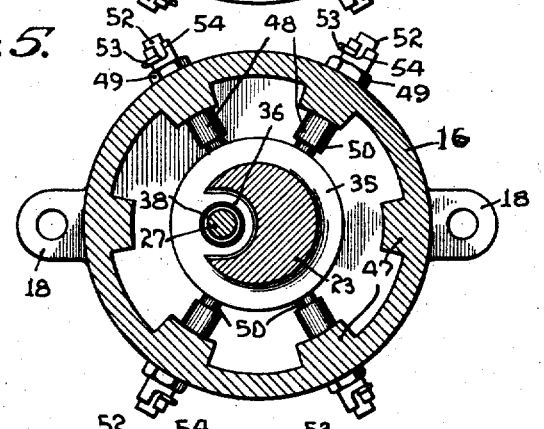
Figure 6:
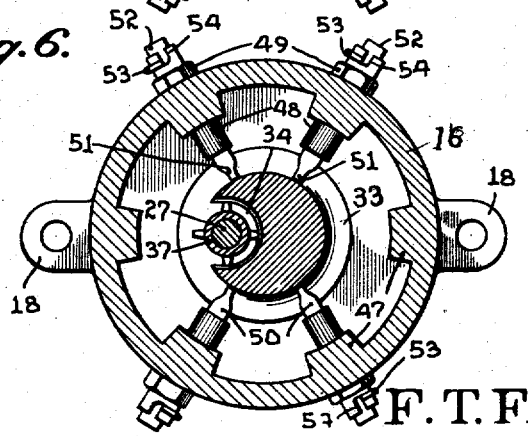

Figure 2 is an enlarged sectional view of the device, showing the machine in position upon an engine block of conventional construction, Figure 3 is a view similar to Figure 2, the manner in which the cutter may be mechanically retracted within the base of the machine, Figure 4 is a transverse section on the line 4—4 of Figure 2, looking in the direction of the arrows, Figure 5 is a transverse section on the line 5—5 of Figure 2, looking in the direction of the arrows, Figure 6 is a transverse section on the line 6—6 of Figure 2, looking in the direction of the arrows, Figure 7 is an enlarged detail section showing the mounting of the feed dogs employed, and Figure 8 is a detail plain view of the upper end of the boring bar.

In carrying the invention into effect, I employ a cylindrical base 10 provided in opposite sides thereof with sight openings 11 and formed at its lower end with a plurality of projecting lugs 12 by which the base may be bolted to an engine block. In the drawings, I have conventionally shown an engine block at 13 and one of the cylinders of the block at 14. Formed on the base at its upper end are oppositely disposed ears 15.

Mating with the base is a cylindrical gear case or casing 16 upon the bottom wall of which is formed an annular boss or shoulder 17 snugly fitting within the base and centering the gear case with respect thereto. Projecting from the gear case at opposite sides thereof are oppositely disposed ears 18 registering with the ears 15 and freely fitted through the ears 18 to be threaded through the ears 15 are cap bolts 19 detachably connecting the gear case with the base. Closing the gear case is a cap plate 20 detachably secured in position by a plurality of cap screws and formed on said plate axially thereof, is an upstanding bearing 21. An annular shoulder 20′ on the cap plate fits in an annular recess in casing 16 thus insuring proper engagement of the bevel gears hereinafter described and the plate 20 rests on or close to the upper end of beveled gear 45 to hold it in place against the collar 35 which through feed star 37 acts on lug 33 to hold the same down on the upper end of flange 22. The bottom wall of the gear case is provided with a similar bearing 22 and journaled through said bearings is a boring bar 23 upon the lower end of which is removably threaded a cutterhead 24. This cutterhead may be of any approved construction, the cutterhead forming no part of the present invention. Formed in the boring bar throughout the major portion of its length is a longitudinally extending arcuate channel 25 opening at one end through the upper end of the bar and terminating at its opposite end near the lower end of the bar to define a web 26. Journaled at one end in said web is a rod threaded to provide a feed screw 27 centered with respect to said channel and journaled at its opposite end through a cap plate 28, which, as shown in detail in Figure 8, is screwed to the upper end of the bar, collars 29 being fixed upon the feed screw at opposite sides of said plate for holding the screw against vertical movement. At its upper end the feed screw is formed with a squared terminal 30 and rising from the cap plate is a pin or post 31 with which is removably engaged a locking plate 32 fitting over the terminal 30 of the feed screw for holding said screw against rotation.

Slidably surrounding the boring bar 23 within the gear case 16 is a bearing plate or ring 33 resting upon the inner end of the bearing 22 and, as best shown in Figure 6, provided at one side with an arcuate lug 34 freely received within the channel 25 of the bar. Slidably surrounding the bar above the plate 33 is a similar bearing plate or ring 35 which, as shown in Figure 5, is provided at one side with an arcuate lug 36 similar to the lug 34 of the ring 33, the lug 36 being also freely received within the channel 25 of the boring bar. Confined between said bearing plates is a nut having radiating wings (Figure 6) extending lengthwise thereof to provide a feed star 37 threaded upon the feed screw 27 and provided at its opposite sides with tubular trunnions or hub flanges 38 journaled through the lugs 34 and 36 of the bearing plates. The feed star is, as best shown in Figure 6, preferably provided with four wings but the number of wings employed upon the star may, of course, be varied. As will be perceived, when the boring bar is rotated, the lugs of the bearing plates will coact with the bar to effect turning of the plates therewith so that the boring bar, the plates, the feed screw, and feed star will revolve as a unit. Formed on the bearing 21 at one side thereof is a radially directed enlargement 39 from which extends an overhanging bearing 40 and extending through this bearing is a shaft 41, the inner end of which is journaled in a suitable opening in the adjacent side of the bearing 21. Fixed to the inner end portion of said shaft within the enlargement is a beveled pinion 42 projecting into the gear case and holding the shaft against longitudinal movement is a collar 43, while with the outer end portion of the shaft is removably engaged a crank 44. Resting upon the bearing plate 35 to coact with the cap plate 20 of the gear case is a beveled gear or pinion 45 meshing with the pinion 42. The gear 45 slidably receives the boring bar therethrough and, as best shown in Figure 4, is provided at one side with a key or boss 46 freely received within the channel 25 of the bar but coupling the gear with the bar so that when the gear is driven by turning of the crank 44, the bar will be rotated. As will be observed, the boss 46 is cut away to freely accommodate the feed screw 27.

Integrally formed on the side wall of the gear case are spaced vertical reinforcing ribs 47 and threaded through adjacent ribs at opposite sides of the case are sleeves 48 lying in the plane of the feed star 37 and which may be adjusted radially with respect to the axis of the boring bar. Threaded upon the outer end portions of said sleeves are nuts 49 and slidable in said sleeves are pairs of feed dogs 50 provided at their inner ends with flattened terminals 51 and having stems 52 slidably projecting through the outer end portions of the sleeves. Fitting through the stems are laterally directed pins 53 and, as will now be observed upon particular reference to Figures 4, 5 and 6 of the drawings, the outer end portions of the sleeves 48 are provided at their upper sides with substantially L-shaped slots 54 freely receiving said pins. Surrounding the stems of the dogs within the sleeves 48 are springs 55 urging the dogs inwardly. When the boring bar is rotated, the feed star 37 will, of course, travel in a circular path and, as will be noted, the terminals 51 of the feed dogs normally project into said path for engagement with the teeth of the star, the flat sides of said terminals being presented to the star teeth. In this position of the dogs, the pins 53 thereof are disposed in the laterally directed portions of the slots 54 in the guide sleeves 48 so that the dogs will thus be locked in active position. However, by rotating the dogs until the pins are brought into the longitudinally directed portions of said slots, the dogs may be retracted to inactive position and the dogs moved to engage the pins with the outer ends of the guide sleeves for holding the dogs so retracted.

As will now be readily understood in view of the preceding description, the crank 44 may be turned for rotating the cutter 24. Coincidently, the feed star 37 will engage the terminals 51 of the feed dogs 50 selectively to be rotated step by step by said dogs so that as the boring bar revolves, the cutter will be advanced into the cylinder 14, the feed screw 27 being held against individual rotation and the feed star traveling upon said screw longitudinally thereof. To vary the rate of feed of the boring bar for a constant rate of rotation thereof, it is simply necessary to retract one or more of the feed dogs to inactive position in the manner previously explained. In reboring the engine cylinder it is quite often necessary to remove the cutterhead so that the progress of the work may be carefully inspected. To accomplish this object, the crank 44 is removed as is also the locking plate 32. A crank 56 is, as shown in Figure 3, then engaged with the terminal 30 of the feed screw and operated for counter-rotating the screw, the feed star 37 being moved to engage one of the feed dogs 50 to be held against rotation thereby. Consequently, counter-rotation of the feed screw will, under such conditions, serve to retract the cutterhead and, as will be noted, the cutterhead may be withdrawn to a position within the base 10. Accordingly, by removing the cap bolts 19, the gear case 16 may be detached from the base for entirely removing the cutterhead when access to the cylinder may be easily had. The cutterhead may, as will thus be seen, be removed from the cylinder without molesting the centering of the base 10 so that when it is desired to complete the boring of the cylinder, the gear case may simply be replaced upon the base when the cutterhead will be accurately centered with respect to the cylinder.

Having thus fully described my said invention, what I claim as new and desire to secure by Letters Patent is:

1. A cylinder reboring machine including supporting means, a boring bar journaled thereon, a feed screw carried by the bar, bearing plates slidable upon the bar, a feed star upon the screw confined between said plates, and means upon the supporting means disposed to engage said star for advancing the bar upon rotation thereof.

2. A cylinder reboring machine including supporting means, a boring bar journaled thereon and provided with a channel, a feed screw journaled upon the bar extending within said channel, bearing plates slidable upon the bar and having lugs projecting within the channel and connecting the plates to the bar to turn therewith, a feed star upon the screw having trunnions journaled in said plates, and means upon the supporting means disposed to engage said star for advancing the bar upon rotation thereof.

3. A cylinder reboring machine including a gear case having top and bottom walls, a boring bar journaled through said walls, a feed screw upon the bar, bearing plates slidable upon the bar, one of said plates coacting with the bottom wall, a feed star upon the screw confined between said plates, a drive gear slidable upon the bar but coupled therewith for driving the bar, said gear coacting with the other of said plates and the top wall of the gear case, and means upon the gear case disposed to engage said star for advancing the bar upon rotation thereof.

4. A cylinder reboring machine including supporting means, a longitudinally movable boring bar journaled thereon, a feed screw carried by the bar eccentrically thereof, feeding means rotatable on said screw for advancing the screw and bar longitudinally, means upon said supporting means to coact with the feeding means for rotating the feeding means when the bar is turned, and means for normally locking the feed screw against individual rotation.

5. A cylinder reboring machine including supporting means, a longitudinally movable boring bar journaled thereon, a feed screw carried by the bar eccentrically thereof, feeding means rotatable on said screw for advancing the screw and bar longitudinally, means upon said supporting means to coact with the feeding means for rotating the feeding means when the bar is turned, and a locking plate adapted to coact between the bar and the upper end of the feed screw for normally locking the screw against individual rotation.

6. A cylinder reboring machine including supporting means, a longitudinally movable boring bar journaled thereon, a feed screw carried by the bar eccentrically thereof, feeding means rotatable on said screw for advancing the screw and bar longitudinally, and means upon said supporting means to coact with the feeding means for rotating the feeding means when the bar is turned and adapted to lock said feeding means against individual rotation whereby the feed screw may be turned and the bar retracted.

7. A cylinder reboring machine including supporting means, a boring bar journaled thereon, feeding means carried by the bar, and dogs upon the supporting means normally disposed to selectively engage said feeding means for advancing the bar upon rotation thereof, the dogs being retractable to inactive position for varying the rate of feed of the bar for a constant rate of rotation thereof.

8. A cylinder reboring machine including supporting means, a boring bar journaled thereon, feeding means upon the bar, spring pressed dogs upon the supporting means normally disposed to selectively engage the feeding means for advancing the bar upon rotation thereof, the dogs being retractable to inactive position for varying the rate of feed of the bar for a constant rate of rotation thereof, and means for locking the dogs in retracted position.

9. In a cylinder reboring machine, the combination with a rotatable longitudinally novable boring bar, of supporting means for the bar, an eccentrically located feed screw carried by the bar, feeding means upon said screw disposed to travel in a circular path when the bar is rotated, and stationary means upon said supporting means disposed for engagement by said feeding means in its traveling movement for advancing the bar longitudinally upon rotation thereof.

10. In a cylinder reboring machine, the combination with a rotatable longitudinally movable boring bar, of supporting means for the bar, an eccentrically located rotatable feed screw carried by the bar, feeding means upon said screw disposed to travel in a circular path when the bar is rotated, stationary means upon said supporting means disposed for engagement by said feeding means in its traveling movement for advancing the bar longitudinally upon rotation thereof, and means coacting between the bar and screw at one end the screw normally locking the screw against rotation during the feeding operation.

11. In a cylinder reboring machine, the combination with a rotatable longitudinally movable boring bar, of supporting means for the bar, feeding means mounted to travel with the bar in a circular path when the bar is rotated, and companion stationary means upon said supporting means disposed for engagement by said feeding means in its traveling movement for advancing the bar upon rotation thereof and movable independently of each other to inactive position for varying the rate of such advance for a constant rate of rotation of the bar.

12. In a cylinder reboring machine, a casing, a boring bar carried thereby, a cutterhead on the bar, means on the casing for rotating the bar, a hollow base adapted to be secured to a cylinder block independently of the casing with its bore in alinement with a cylinder, an annular shoulder on the casing fitting within the bore of the base, and means for securing the casing detachably to the base, substantially as set forth.

13. In a cylinder reboring machine, a casing, a boring bar carried thereby, a cutterhead on the bar, a hollow base adapted to be secured to a cylinder block with its bore in alinement with a cylinder, an annular shoulder on the casing fitting within the bore of the base, means for securing the casing detachably to the base, a detachable cap plate at the upper end of the casing having an annular shoulder resting in an annular recess of the casing, means for detachably securing the cap plate to the casing to center the plate relative thereto, a gear on the boring bar, and means for driving said gear including a gear carried by the cap plate having teeth meshing with the first-named beveled gear, substantially as set forth.

14. A cylinder reboring machine including a support, a boring bar journaled thereon, a feed screw carried by the bar near the periphery of said bar and parallel to its axis, a nut upon said screw, and means upon the support to rotate said nut for advancing the bar and the feed screw upon rotation thereof, substantially as set forth.

15. A cylinder reboring machine including a boring bar having axial and rotary movement, a support therefor, an eccentrically mounted feed screw movable lengthwise with the bar, a nut rotatable on the screw but held against movement lengthwise of the same, and means on the support to cause relative rotation between the screw and the nut upon rotation of the bar.

16. A cylinder reboring machine including a boring bar having axial and rotary movement, a support therefor, an eccentrically mounted feed screw movable lengthwise with the bar, a nut rotatable on the screw but held against movement lengthwise of the same, and means on the support to vary the rate of relative rotation between the screw and the nut upon rotation of the bar.

17. In a cylinder reboring machine, a support, a boring bar journaled thereon, a feed screw on the boring bar, a nut on the screw, means for rotating the nut as the boring bar rotates to feed the bar through the work, locking means on the boring bar for normally holding the feed screw against rotation relative to said boring bar said locking means when released permitting the screw to be rotated independently of said boring bar, substantially as set forth.

18. A cylinder reboring machine comprising a support, a boring bar journaled thereon, feeding means including a planetary element on the bar, and means on the support for selectively varying the rate of feed of the boring bar, substantially as set forth.

In witness whereof, I have hereunto set my hand and seal at Washington, D. C., this 9th day of May, A. D. nineteen hundred and twenty-four.

FREDERICK T. FLINCHBAUGH.